H. L. PIKE.
Baling-Press.

No. 165,252.

2 Sheets--Sheet 1.

Patented July 6, 1875.

Witnesses
Geo. H. Strong.
Jno. L. Boone.

Inventor
Hervey L. Pike
by Dewey & Co.
Attys

2 Sheets--Sheet 2.
H. L. PIKE.
Baling-Press.
No. 165,252. Patented July 6, 1875.
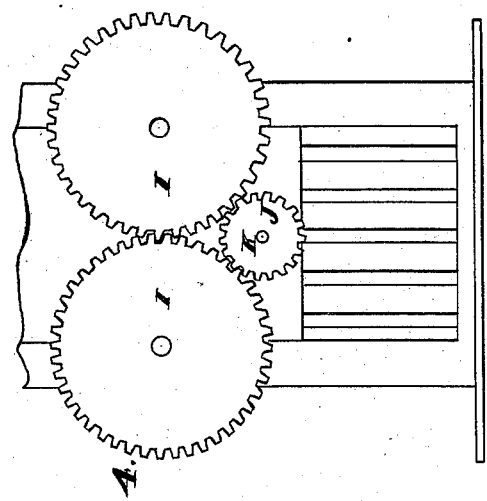
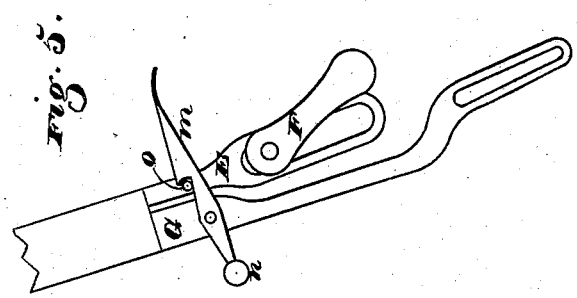
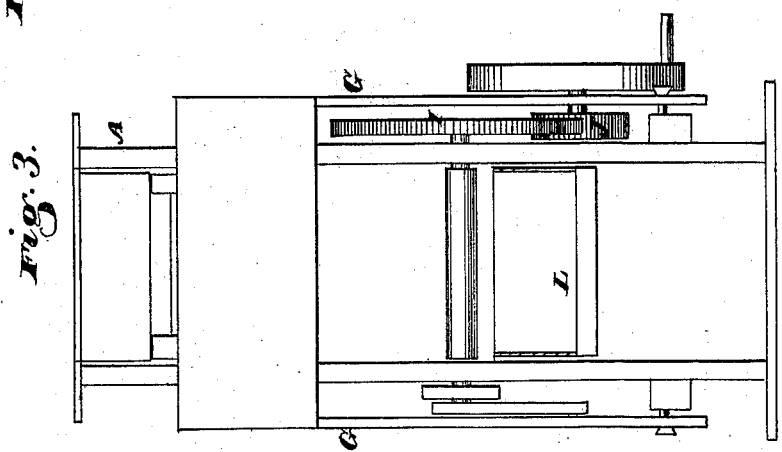
Witnesses
Geo. H. Strong.
Jno. L. Boyne
Inventor
Henry L. Pike
by Dewey & Co
Attys

UNITED STATES PATENT OFFICE.

HERVEY L. PIKE, OF SEATTLE, WASHINGTON TERRITORY.

IMPROVEMENT IN BALING-PRESSES.

Specification forming part of Letters Patent No. 165,252, dated July 6, 1875; application filed May 31, 1875.

*To all whom it may concern:*

Be it known that I, HERVEY L. PIKE, of Seattle, King county, Washington Territory, have invented a Continuous Double-Acting Baling-Press; and I do hereby declare the following description and accompanying drawings are sufficient to enable any person skilled in the art or science to which it mostly appertains to make and use my said invention, without further invention or experiment.

My invention relates to certain improvements in baling-presses, by which I am enabled to make the action continuous—forming and pressing the bale at the same time.

My press, which I call a double-folding continuous press, consists of an upright box or case, into which the material to be baled is fed from the top, alternately from one side and the other. Two pressure-plates are operated alternately from one side and the other by suitable mechanism, so that they are carried in above the material and drawn down upon it, the plate below being withdrawn just as the other passes in above the new charge, until the bale is sufficiently large, when, the bale being tied, may be discharged below, and another follower introduced to pass down in turn.

Figure 2:
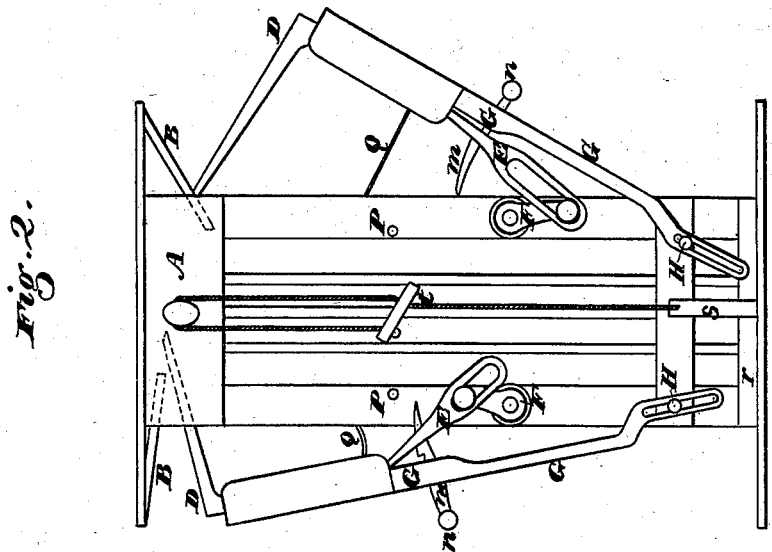
Figure 1:
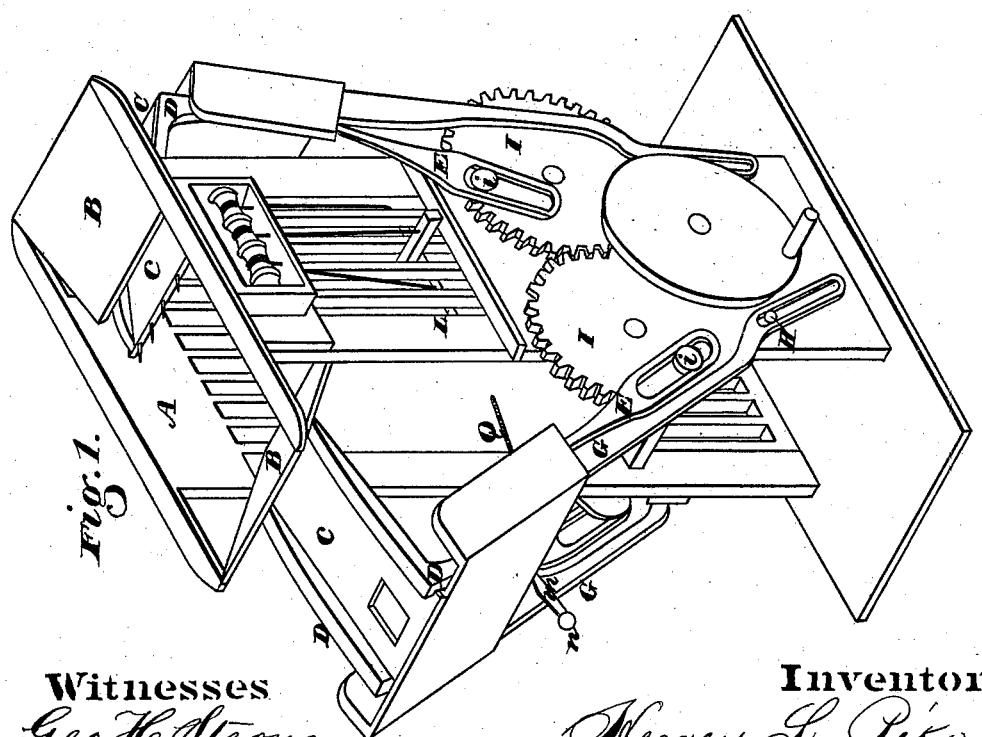

Referring to the accompanying drawings for a more complete explanation of my invention, Figure 1, Sheet I, is a perspective view of my press; Fig. 2 is a side elevation; Fig. 3, Sheet II, is a an end view; Figs. 4, 5 are detailed views of parts of the machine.

A is an upright box or case made strongly enough to resist pressure. The sides are made of vertical timbers, with spaces between to admit of ropes to the bale after it is formed. At the top of the case, or press, are two platforms, B B, one at each end, and they are hinged, or pivoted, so that their inner ends can move up and down as they are moved by the pressure-plates alternately rising and falling beneath them.

The pressing-plates C are strongly made, having angle-iron D, as shown. These irons are bolted to the plates C, and, turning down at right angles outside of the press, they are secured to wooden or iron connecting-rods E, which extend down to the cranks F upon each side of the press. Guide-rods G also extend down, and their slotted lower ends move upon pins H which project from the frame. The crank-pins upon one side of the press are attached to gear-wheels I, these wheels being secured to the same shaft with the cranks F. The gears I are driven by a pinion, J, which is mounted upon the driving-shaft K just below, and meshes into both gear-wheels.

The operation will be as follows: A follower, L, which fits the interior of the press A, is introduced at the top of the press, and descends to a point on the press as low as may be desired, where it is supported by means of the movable side which is compressed against it. The bale rope is put over the rollers at the top, passed down, and drawn through the follower, by a peculiar needle for the purpose. Hay, or any other substance to be pressed, is introduced at the top of the press, being fed alternately to one end and the other by means of the inclined feeding-platforms B, which are alternately allowed to fall for the reception of the material by the up and down motion of the pressing-plates. The crank-pins $i$, moving in the slotted lower ends of the connecting-rods E, will raise the plates C, which stand back at such an angle as to leave their inner ends entirely clear of the sides of the press, until they are at the proper height to be moved forward above the charge which has just been introduced at the top. In order to do this, the connecting-rods E and the guide-rod G upon each side must be temporarily connected together. This may be done in various ways, but I have shown an arm, $m$, which is pivoted to the inside of the guide-rod G. Its outer end is weighted at $n$, and a notch in front of its point of suspension is thus held in contact with a pin, $o$, upon the connecting-rod. By this means, when the crank-pin $i$ begins to pass over the top of its circular track, it will draw the connecting-rod, guide-rod, and the pressing-plate C inward, until the guide-rods stand vertical, and the plate C upon that side stands above the material in the press. At this moment the beveled inner end of the arm $m$ is brought into contact with a pin, P, secured to the side of the press, and this detaches the connecting-rod E from the guide G, thus allowing the connecting-rod to separate from the guide, as it must do to allow the crank to finish its movement. As the crank passes down to the lower part of its curve, it allows the plate C to descend and thus press the bale. As this action takes place alternately with each of the plates C upon material introduced alternately from one and the other of the inclined feeding-platforms B, it will be seen that the action of the press will be continuous, and that the material will be properly placed in the feeding to make an even bale. As the cranks finish the lower part of their curve and again begin to ascend, the connecting-rod will come in contact with the guide-rod, and the latch m will again unite the two, so that the further movement of the crank will cause them to fall outward far enough to withdraw the plate C from the press, and allow the other plate to act. A rope or chain, Q, limits the distance to which the arms fall outward. The bale, after being thus formed and pressed, is tied by cords passing through between the open side timbers, as before described, and the finished bales are removed at the bottom. The movable side, which compresses and holds the follower, is hinged at the top, and is operated at the bottom by eccentric or cam rollers r and a lever, s. This lever may be held up by the rope and cramping device shown at t.

Having thus described my invention, what I claim, and desire to secure by Letters Patent, is—

1. The pressing-plates C, with their connecting-arms E, guide-rods G, and cranks F, for the purpose of giving the plates a downward motion, and withdrawing them from the press alternately, substantially as and for the purpose herein described.

2. The connecting-rods E, extending from the plates C to the crank F, and the guide-rod G, together with the connecting-latch m, and the stationary pin P, for the purpose of alternately uniting and releasing the rods as they move, substantially as herein described.

3. The feeding-tables B, hinged at their outer ends, and having their inner ends alternately depressed and elevated by the movement of the presser C, so that the material can be fed beneath each presser alternately, substantially as herein described.

HERVEY L. PIKE.

Witnesses:
W. H. SHOUDY,
NATHANIEL HILTON.